(12) United States Patent
Gruenstein et al.

(10) Patent No.: US 12,094,472 B2
(45) Date of Patent: *Sep. 17, 2024

(54) SERVER SIDE HOTWORDING

(71) Applicant: GOOGLE LLC, Mountain View, CA (US)

(72) Inventors: Alexander H. Gruenstein, Mountain View, CA (US); Petar Aleksic, Jersey City, NJ (US); Johan Schalkwyk, Scarsdale, NY (US); Pedro J. Moreno Mengibar, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,077

(22) Filed: Jun. 30, 2023

(65) Prior Publication Data

US 2023/0343340 A1 Oct. 26, 2023

Related U.S. Application Data

(63) Continuation of application No. 17/337,182, filed on Jun. 2, 2021, now Pat. No. 11,699,443, which is a
(Continued)

(51) Int. Cl.
*G10L 15/30* (2013.01)
*G10L 15/26* (2006.01)
(Continued)

(52) U.S. Cl.
CPC .............. *G10L 15/30* (2013.01); *G10L 15/26* (2013.01); *G10L 15/32* (2013.01);
(Continued)

(58) Field of Classification Search
CPC ....... G10L 15/30; G10L 15/183; G10L 15/26; G10L 15/32; G10L 2015/088; G10L 2015/223
(Continued)

(56) References Cited

U.S. PATENT DOCUMENTS 8,768,712 B1 7/2014 Sharifi
9,202,462 B2 12/2015 Martin et al.
(Continued)

FOREIGN PATENT DOCUMENTS

CN 103714104 A 4/2014
CN 104798031 A 7/2015
(Continued)

OTHER PUBLICATIONS

Douglas O'Shaughnessy, "Automatic Speech Recognition," in Speech Communications: Human and Machine , IEEE, 2000, pp. 367-435, doi: 10.1109/9780470546475.ch10. (Year: 2000) (Year: 2000) (Year: 2000).*
(Continued)

*Primary Examiner* — Bharatkumar S Shah
(74) *Attorney, Agent, or Firm* — Oblon, McClelland, Maier & Neustadt, L.L.P.

(57) ABSTRACT

Methods, systems, and apparatus, including computer programs encoded on computer storage media, for detecting hotwords using a server. One of the methods includes receiving an audio signal encoding one or more utterances including a first utterance; determining whether at least a portion of the first utterance satisfies a first threshold of being at least a portion of a key phrase; in response to determining that at least the portion of the first utterance satisfies the first threshold of being at least a portion of a key phrase, sending the audio signal to a server system that determines whether the first utterance satisfies a second
(Continued)

threshold of being the key phrase, the second threshold being more restrictive than the first threshold; and receiving tagged text data representing the one or more utterances encoded in the audio signal when the server system determines that the first utterance satisfies the second threshold.

20 Claims, 4 Drawing Sheets

Related U.S. Application Data continuation of application No. 16/885,151, filed on May 27, 2020, now Pat. No. 11,049,504, which is a continuation of application No. 16/392,829, filed on Apr. 24, 2019, now Pat. No. 10,706,851, which is a continuation of application No. 15/432,358, filed on Feb. 14, 2017, now Pat. No. 10,311,876.

(51) Int. Cl.
*G10L 15/32* (2013.01)
*G10L 15/08* (2006.01)
*G10L 15/183* (2013.01)
*G10L 15/22* (2006.01)

(52) U.S. Cl.
CPC ...... *G10L 2015/088* (2013.01); *G10L 15/183* (2013.01); *G10L 2015/223* (2013.01)

(58) Field of Classification Search
USPC .......................................................... 704/252
See application file for complete search history.

(56) References Cited

U.S. PATENT DOCUMENTS

| | | | |
|---|---|---|---|
| 10,762,903 | B1 | 9/2020 | Kahan |
| 2002/0082833 | A1 | 6/2002 | Marasek et al. |
| 2012/0166196 | A1* | 6/2012 | Ju ........................... G10L 15/19 704/E15.005 |
| 2013/0080175 | A1* | 3/2013 | Mori ..................... G06F 40/117 704/E13.011 |
| 2014/0163978 | A1 | 6/2014 | Basye et al. |
| 2014/0229184 | A1 | 8/2014 | Shires |
| 2014/0278435 | A1 | 9/2014 | Ganong et al. |
| 2015/0154954 | A1 | 6/2015 | Sharifi |
| 2015/0279351 | A1 | 10/2015 | Nguyen et al. |
| 2015/0340032 | A1* | 11/2015 | Gruenstein ............ G06N 3/045 704/232 |
| 2016/0055847 | A1 | 2/2016 | Dahan |
| 2016/0171975 | A1 | 6/2016 | Sun et al. |
| 2016/0180838 | A1 | 6/2016 | Martin et al. |
| 2016/0267913 | A1 | 9/2016 | Kim et al. |
| 2016/0351199 | A1 | 12/2016 | Foerster et al. |
| 2016/0379635 | A1 | 12/2016 | Page |
| 2018/0233150 | A1 | 8/2018 | Gruenstein et al. |
| 2020/0243094 | A1 | 7/2020 | Thomson |

FOREIGN PATENT DOCUMENTS

| | | |
|---|---|---|
| JP | 2015-11170 A | 1/2015 |
| JP | 2020-507815 A | 3/2020 |
| WO | WO 2018/151772 A1 | 8/2018 |
| WO | WO 2020/204907 A1 | 10/2020 |

OTHER PUBLICATIONS

T. Kawahara, Chin-Hui Lee and Biing-Hwang Juang, "Flexible speech understanding based on combined key-phrase detection and verification," in IEEE Transactions on Speech and Audio Processing, vol. 6, No. 6, pp. 558-568, Nov. 1998, doi: 10.1109/89.725322. (Year: 1998) (Year: 1998) (Year: 1998).*
M. Gilbert, J. G. Wilpon, B. Stern and G. Di Fabbrizio, "Intelligent virtual agents for contact center automation," in IEEE Signal Processing Magazine, vol. 22, No. 5, pp. 32-41, Sep. 2005, doi: 10.1109/MSP.2005.1511822. keywords: {Intelligent agent; Automation; Learning systems; Explosions; Multimedia (Year: 2005).*
Douglas O'Shaughnessy, "Automatic Speech Recognition," in Speech Communications: Human and Machine, IEEE, 2000, pp. 367-435, doi: 10.1109/9780470546475.ch 10. (Year: 2000).
Japanese Office Action issued on Sep. 7, 2020 in Patent Application No. 2019-543379 (with English translation), 6 pages.
Extended European Search Report issued Dec. 11, 2020 in European Patent Application No. 20194 706.6, 6 pages.
International Search Report and Written Opinion issued in International Application No. PCT/US2017/058944, mailed on Apr. 16, 2018, 19 pages.
Invitation to Pay Additional Fees with Partial Search Report issued in International Application No. PCT/US2017/058944, mailed on Feb. 22, 2018, 13 pages.
Notice of Reasons for Rejection issued May 16, 2022 in Japanese Patent Application No. 2021-042293 (with English language translation), 12 pages.
T. Kawahara, Chin-Hui Lee and Biing-Hwang Juang, "Flexible speech understanding based on combined key-phrase detection and verification," in IEEE Transactions on Speech and Audio Processing, vol. 6, No. 6, pp. 558-568, Nov. 1998, doi: 10.1109/89.725322. (Year: 1998) (Year: 1998).
European Office Action issued Feb. 6, 2023 in European Patent Application No. 20 194 706.6, 5 pages.
Combined Chinese Office Action and Search Report issued Aug. 31, 2022 in Chinese Patent Application No. 201780086256.0 (with English translation), 12 pages.
Notice of Allowance issued Nov. 7, 2022 in Japanese Patent Application No. 2021-042293, 3 pages.
European Office Action issued Nov. 24, 2023 in European Patent Application No. 20 194 706.6, 3 pages.

* cited by examiner

SERVER SIDE HOTWORDING

CROSS-REFERENCE TO RELATED APPLICATIONS

This patent application is a continuation of, and claims priority under 35 U.S.C. § 120 from, U.S. patent application Ser. No. 17/337,182, filed on Jun. 2, 2021, which is a continuation of U.S. patent application Ser. No. 16/885,151, filed on May 27, 2020, which is a continuation of U.S. patent application Ser. No. 16/392,829, filed on Apr. 24, 2019, now U.S. Pat. No. 10,706,851, issued Jul. 7, 2020, which is a continuation of U.S. patent application Ser. No. 15/432,358, filed on Feb. 14, 2017, now U.S. Pat. No. 10,311,876, issued Jun. 4, 2019. The disclosures of these prior applications are considered part of the disclosure of this application and are hereby incorporated by reference in their entireties.

BACKGROUND

Automatic speech recognition is one technology that is used in mobile devices among other types of devices. One task that is a common goal for this technology is to be able to use voice commands to wake up a device and have basic spoken interactions with the device. For example, it may be desirable for the device to recognize a "hotword" that signals that the device should activate when the device is in a sleep state.

SUMMARY

A system may use two thresholds to determine whether a user spoke a key phrase. A client device, included in the system, uses the first, lower threshold to determine whether a portion of words spoken by the user are the same as a portion of the key phrase. For instance, when the key phrase is "okay google," the client device may use the first, lower threshold to determine whether the user spoke "okay" or "okay g" or "okay google." When the client device determines that the portion of the words spoken by the user are the same as a portion of the key phrase, the client device sends data for the words to a server. The server uses a second, higher threshold to determine whether the words spoken by the user are the same as the key phrase. The server analyzes the entire key phrase to determine whether the user spoke the key phrase. When the server determines that the key phrase is included in the words, the server may parse other words spoken by the user to generate data for an action that the client device should perform.

In some implementations, a client device may receive an audio signal that encodes one or more utterances. The client device uses a first threshold to determine whether one or more first utterances encoded at the beginning of the audio signal satisfy a first threshold of being a key phrase. The client device may analyze a portion of an utterance, a single utterance from the one or more first utterances when the key phrase includes multiple words, or both.

When the client device determines that the one or more first utterances satisfy the first threshold of being a key phrase, the client device sends the audio signal to a speech recognition system, e.g., included on a server separate from the client device, for additional analysis. The speech recognition system receives the audio signal. The speech recognition system analyzes the one or more first utterances to determine whether the one or more first utterances satisfy a second threshold of being the key phrase. The second threshold is more restrictive than the first threshold, e.g., the first threshold is less accurate or lower than the second threshold. For instance, when the first threshold and the second threshold are both likelihoods, the first threshold, e.g., fifty percent, is a lower likelihood than the second threshold, e.g., seventy-five or ninety percent. For the one or more first utterances to satisfy the first threshold or the second threshold of being a key phrase, a corresponding system may determine that the likelihood of the one or more first utterances being the key phrase is greater than, or greater than or equal to, the respective threshold.

The speech recognition system receives, from the client device, data for the entire audio signal including the one or more first utterances so that the speech recognition system can analyze all of the data included in the audio signal. For example, to reduce the possibility of the speech recognition system receiving data for an audio signal that includes a partial utterance at the beginning of the audio signal, to improve the speech recognition analysis by the speech recognition system, or both, the speech recognition system receives the entire audio signal from the client device when the client device determines that at least a portion of the one or more first utterances satisfy the first threshold of being the key phrase.

In some implementations, the client device may analyze a prefix or a portion of one of the first utterances. For instance, when the key phrase is "Okay Google", the client device may determine that the one or more first utterances encode "Okay G" or "Okay" without analyzing all of the second utterance and, in response, send the audio signal to the speech recognition system.

In some implementations, the client device may send, with the data for the audio signal and to the speech recognition system, data for the key phrase. The data for the key phrase may be text representing the key phrase, or an identifier, e.g., for the client device, which the speech recognition system may use to determine the key phrase. The speech recognition system may use the data for the key phrase to determine whether the one or more first utterances included in the audio signal satisfy the second threshold of being the key phrase.

In general, one innovative aspect of the subject matter described in this specification can be embodied in methods that include the actions of receiving an audio signal encoding one or more utterances including a first utterance; determining whether at least a portion of the first utterance satisfies a first threshold of being at least a portion of a key phrase; in response to determining that at least the portion of the first utterance satisfies the first threshold of being at least a portion of a key phrase, sending the audio signal to a server system that determines whether the first utterance satisfies a second threshold of being the key phrase, the second threshold being more restrictive than the first threshold; and receiving, from the server system, tagged text data representing the one or more utterances encoded in the audio signal when the server system determines that the first utterance satisfies the second threshold. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, from a client device, an audio signal encoding one or more utterances including one or more first utterances for which the client device determined that at least a portion of the one or more first utterances satisfies a first threshold of being at least a portion of a key phrase; determining whether the one or more first utterances satisfy a second threshold of being at least a portion of the key phrase, the second threshold more restrictive than the first threshold; and sending, to the client device, a result of determining whether the one or more first utterances satisfy the second threshold of being the key phrase. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include performing an action using the tagged text data subsequent to receiving, from the server system, the tagged text data representing the one or more utterances encoded in the audio signal when the server system determines that the first utterance satisfies the second threshold. The one or more utterances may include two or more utterances, the first utterance encoded prior to the other utterances from the two or more utterances in the audio signal. Performing the action using the tagged text data may include performing an action using the tagged text data for the one or more utterances encoded in the audio signal after the first utterance. Determining whether at least a portion of the first utterance satisfies the first threshold of being at least a portion of the key phrase may include determining whether at least a portion of the first utterance satisfies the first threshold of being at least a portion of the key phrase that includes two or more words.

In some implementations, the method may include receiving a second audio signal encoding one or more second utterances including a second utterance; determining whether at least a portion of the second utterance satisfies the first threshold of being at least a portion of a key phrase; and in response to determining that at least the portion of the second utterance does not satisfy the first threshold of being at least a portion of a key phrase, discarding the second audio signal. The method may include determining to not perform an action using data from the second audio signal in response to determining that at least the portion of the second utterance does not satisfy the first threshold of being at least a portion of a key phrase. Determining whether at least a portion of the first utterance satisfies the first threshold of being a key phrase may include determining whether at least a portion of the first utterance satisfies a first likelihood of being at least a portion of a key phrase.

In some implementations, sending, to the client device, the result of determining whether the one or more first utterances satisfy the second threshold of being the key phrase may include sending, to the client device, data indicating that the key phrase is not likely included in the audio signal in response to determining that the one or more first utterances do not satisfy the second threshold of being the key phrase. Sending, to the client device, the result of determining whether the one or more first utterances satisfy the second threshold of being the key phrase may include sending, to the client device, data for the audio signal in response to determining that the one or more first utterances satisfy the second threshold of being the key phrase. Sending, to the client device, data for the audio signal in response to determining that the one or more first utterances satisfy the second threshold of being the key phrase may include sending, to the client device, tagged text data representing the one or more utterances encoded in the audio signal. The method may include analyzing the entire audio signal to determine first data for each of the one or more utterances. Sending, to the client device, the data for the audio signal in response to determining that the one or more first utterances satisfy the second threshold of being the key phrase may include sending, to the client device, the first data for the audio signal in response to determining that the one or more first utterances satisfy the second threshold of being the key phrase.

In some implementations, determining whether the one or more first utterances satisfy the second threshold of being the key phrase may include determining, using a language model, whether the one or more first utterances satisfy the second threshold of being the key phrase. The method may include customizing the language model for the key phrase prior to determining, using the language model, whether the one or more first utterances satisfy the second threshold of being the key phrase. The method may include receiving text identifying the key phrase. Customizing the language model for the key phrase may include customizing the language model for the key phrase using the text identifying the key phrase. The method may include receiving an identifier, and determining, using the identifier, key phrase data for the key phrase. Customizing the language model for the key phrase may include customizing the language model for the key phrase using the key phrase data. Determining, using the language model, whether the one or more first utterances satisfy the second threshold of being the key phrase may include determining, using the language model and an acoustic model, whether the one or more first utterances satisfy the second threshold of being the key phrase. Determining, using the language model and the acoustic model, whether the one or more first utterances satisfy the second threshold of being the key phrase may include providing data for the one or more first utterances to the language model to cause the language model generate a first output; providing data for the one or more first utterances to the acoustic model to cause the acoustic model to generate a second output; combining the first output and the second output to generate a combined output, and determining, using the combined output, whether the one or more first utterances satisfy the second threshold of being the key phrase. The method may include selecting the language model for a default key phrase. The method may include determining whether to use the default key phrase.

The subject matter described in this specification can be implemented in particular embodiments and may result in one or more of the following advantages. In some implementations, the systems and methods described in this document may reduce resources used by a client device during hotword analysis with a first, lower threshold, improve an accuracy of hotword analysis by using a second, more restrictive threshold at a speech recognition system, or both. In some implementations, the systems and methods described below may more accurately parse, segment, or both, text in an audio signal, e.g., may more accurately identify a key phrase encoded in the audio signal separate from other utterances encoded in the audio signal, by sending an entire audio signal, that includes the key phrase, to a speech recognition system for analysis. In some implementations, the systems and methods described below may reduce client processing time, send an audio signal to a speech recognition system more quickly, or both, compared to other systems, when the client uses a lower hotword analysis threshold than a more restrictive hotword analysis threshold used by the speech recognition system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
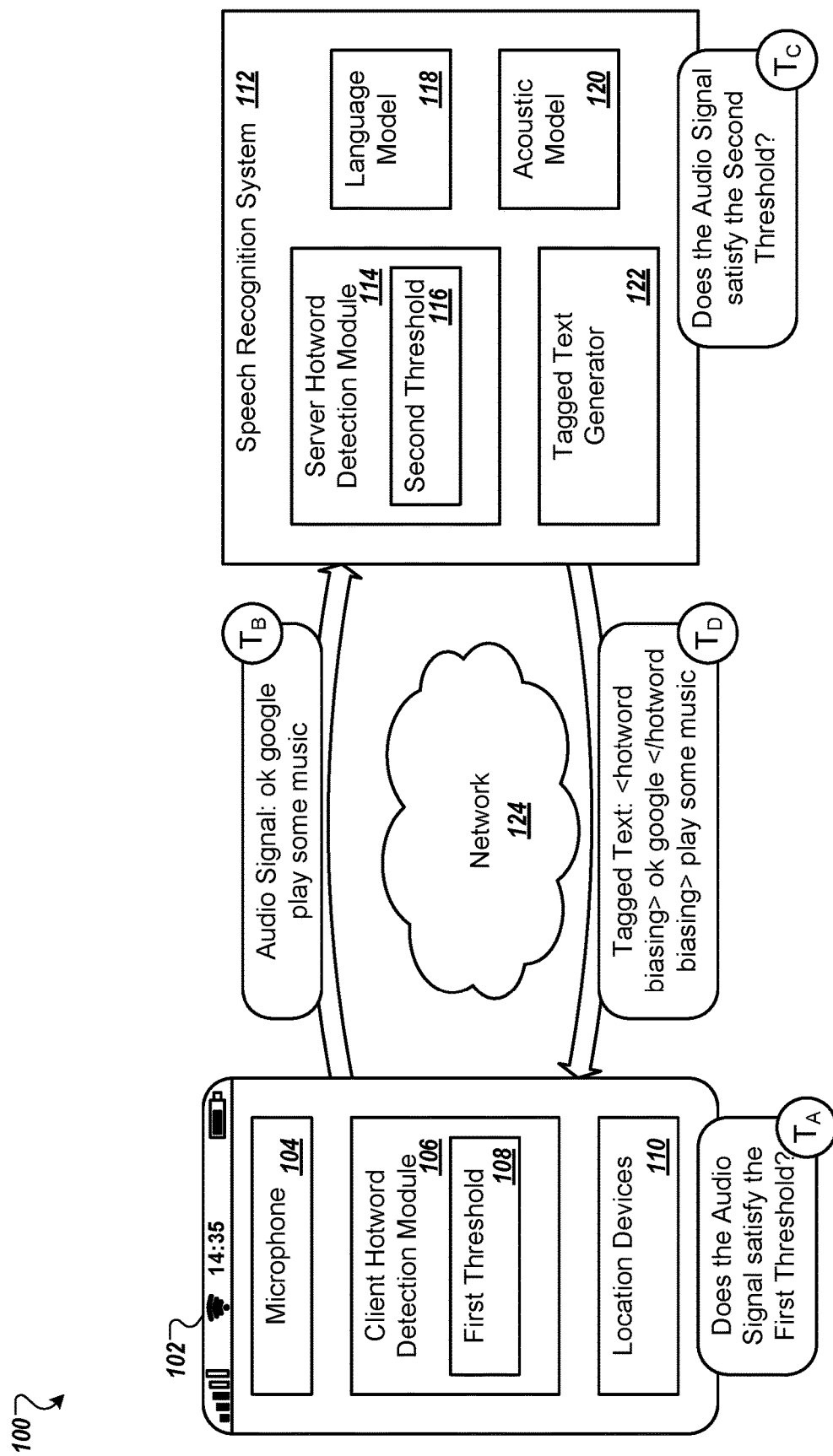
FIG. 1 is an example of an environment in which a client device analyzes an audio signal using a first threshold and a speech recognition system analyzes the audio signal using a second threshold that is more restrictive than the first threshold.

FIG. 1 is an example of an environment 100 in which a client device 102 analyzes an audio signal using a first threshold and a speech recognition system 112 analyzes the audio signal using a second threshold that is more restrictive than the first threshold. The client device 102 uses the first threshold to determine whether the audio signal encodes at least a portion of a key phrase. When the client device 102 determines that the audio signal satisfies the first threshold of being the key phrase, the client device 102 sends the audio signal to the speech recognition system 112 that uses the second threshold to determine whether the audio signal encodes the entire key phrase. If so, the speech recognition system 112 may provide the client device 102 with tagged text data of the utterances encoded in the audio signal to allow the client device 102 to perform an action based on the audio signal.

The client device 102 includes a microphone 104 that captures the audio signal For instance, the client device 102 may be in a lower powered state, e.g., standby, while the microphone 104 captures at least part of the audio signal. The at least part of the audio signal may be the entire audio signal, one or more first utterances included in the audio signal, or a different part of the beginning of the audio signal. One example of utterances encoded in an audio signal is "ok google play some music." In this example, the first utterances may be "ok" or "ok google."

The microphone 104 provides the audio signal, or some of the audio signal as the audio signal is captured, to a client hotword detection module 106. For example, the microphone 104, or a combination of components in the client device 102, may provide portions of the audio signal to the client hotword detection module 106 as the audio signal is captured by the microphone 104.

The client hotword detection module 106, at time $T_A$, determines whether the audio signal satisfies a first threshold 108. For instance, the client hotword detection module 106 may analyze at least a portion of the one or more first utterances, included at the beginning of the audio signal, to determine whether the portion of the one or more first utterances satisfy the first threshold 108 of being a key phrase. The portion of the first utterances may by "ok" or "ok google." One example of a key phrase may be "ok google." In some examples, the client hotword detection module 106 is configured to detect occurrence of only one key phrase. In some implementations, the client hotword detection module is configured to detect occurrence of any of multiple different key phrases, e.g., ten key phrases. The multiple different key phrases include a limited number of different key phrases for which the client hotword detection module 106 is trained.

The client hotword detection module 106 may determine a likelihood that at least a portion of the first utterances are the same as at least a portion of the key phrase. The client hotword detection module 106 may compare the likelihood with the first threshold 108. When the likelihood satisfies the first threshold 108, the client device 102 may send the audio signal to the speech recognition system 112. When the likelihood does not satisfy the first threshold 108, the client device 102 may take no further action based on the utterances included in the audio signal, e.g., and may discard the audio signal.

The client hotword detection module 106 may determine that the key phrase is "ok google" and that the utterance "ok", as one of the first utterances in the audio signal, satisfies the first threshold 108 of being part of the key phrase. In some examples, the client hotword detection module 106 may determine that the utterance "ok google" from the audio signal satisfies the first threshold 108 of being part of the key phrase, e.g., the entire key phrase.

In some implementations, when the client hotword detection module 106 determines that one or a portion of one of the first utterances satisfies the first threshold 108 of being a portion of the key phrase, the client hotword detection module 106 may determine whether a total length of the first utterances matches a length for the key phrases. For instance, the client hotword detection module 106 may determine that a time during which the one or more first utterances were spoken matches an average time for the key phrase to be spoken. The average time may be for a user of the client device 102 or for multiple different people, e.g., including the user of the client device 102.

In some implementations, the client hotword detection module 106 may determine that the total length of the first utterances and a total number of n-grams, e.g., words, included in the first utterances matches a total length of the key phrase and a number of n-grams included in the key phrase, e.g., when only analyzing a portion of a first utterance or of the first utterances. For instance, the client hotword detection module 106 may determine a number of silences between the first utterances that indicates the number of first utterances. The client hotword detection module 106 may compare the number of first utterances, the spoken length of the first utterances, or both, with a total number of words in the key phrase, the spoken length of the key phrase, or both. When the client hotword detection module 106 determines that the total number of first utterances and the total number of words in the key phrase are the same, that the spoken length of the first utterances is within a threshold amount from the spoken length of the key phrase, or both, the client hotword detection module 106 may determine that the first utterances in the audio signal satisfy the first threshold 108 of being the key phrase, e.g., when at least a portion of the first utterances satisfy the first threshold 108 of being a portion of the key phrase.

The first utterances may satisfy the first threshold 108 of being a key phrase when the likelihood is greater than the first threshold 108. The first utterances may satisfy the first threshold 108 of being a key phrase when the likelihood is greater than or equal to the first threshold 108. In some examples, the first utterances do not satisfy the first threshold 108 of being a key phrase when the likelihood is less than the first threshold 108. The first utterances might not satisfy the first threshold 108 of being a key phrase when the likelihood is less than or equal to the first threshold 108.

In response to determining that at least a portion of the first utterances satisfy the first threshold 108 of being at least a portion of a key phrase, the client device 102, at time $T_B$, sends the audio signal to the speech recognition system 112. The speech recognition system 112 receives the audio signal and uses a server hotword detection module 114 to determine, at time $T_C$, whether the audio signal satisfies a second threshold 116 of being the key phrase. For instance, the speech recognition system 112 uses the server hotword detection module 114 to determine whether the audio signal satisfies the second threshold 116 of being a key phrase.

The second threshold 116 is more restrictive than the first threshold 108. For example, the server hotword detection module 114, using the second threshold 116, is less likely to incorrectly determine that the first utterances represent the same text as a key phrase, e.g., are a false positive, compared to the client hotword detection module 106, using the first threshold 108. In some examples, when the thresholds are likelihoods, the first threshold 108 has a lower numerical value than the second threshold 116.

The server hotword detection module 114 may use a language model 118, an acoustic model 120, or both, to determine whether the one or more first utterances satisfy the second threshold 116 of being a key phrase. The language model 118, and the acoustic model 120, are each trained using a large amount of training data, e.g., compared to the client hotword detection module 106. For example, the language model 118, the acoustic model 120, or both, may be trained using 30,000 hours of training data. The client hotword detection module 106 may be trained using 100 hours of training data.

In some examples, the server hotword detection module 114 may create a hotword biasing model, that includes the language model 118, the acoustic model 120, or both, on the fly, for use analyzing the audio signal. For instance, the server hotword detection module 114 may receive data from the client device 102 that identifies a key phrase for which the server hotword detection module 114 will analyze the audio signal to determine whether the client device 102 should wake up, perform an action, or both. The data that identifies the key phrase may be text data for the key phrase, e.g., a text string, or an identifier for the client device 102, e.g., either of which may be included in the request to analyze the audio signal received from the client device 102. The server hotword detection module 114 may use the identifier for the client device 102 to access a database and determine the key phrase for the client device 102 and the audio signal.

In some examples, the server hotword detection module 114 may use a pre-built hotword biasing model. For instance, the server hotword detection module 114 may analyzes multiple audio signals from the client device 102 or from multiple different client devices, all of which are for the same key phrase, using the same hotword biasing model.

The hotword biasing model may identify one or more n-grams for which the hotword biasing model performs analysis. For instance, when the key phrase is "ok google," the hotword biasing model may generate scores for one or more of the n-grams "<S> ok google," "<S> ok." or "ok google," where <S denotes silence at the beginning of a sentence.

One or both of the language model 118 or the acoustic model 120 may use the n-grams for the hotword biasing model to determine whether the audio signal includes the key phrase. For instance, the language model 118 may use one or more of the n-grams to generate a score that indicates a likelihood that the audio signal includes the key phrase. The language model 118 may use the n-grams or some of the n-grams to increase a likelihood that the key phrase is correctly identified in the audio signal when the one or more first utterances are the same as the key phrase. For example, when the key phrase includes two or more words, the language model 118 may add the key phrase, e.g., "ok google," to the language model 118 to increase the likelihood that the key phrase is identified, e.g., compared to when the language model 118 does not already include the key phrase.

The acoustic model 120 may use one or more of the n-grams to generate a score that indicates a likelihood that the audio signal includes the key phrase. For example, the acoustic model 120 may generate multiple scores for different phrases, including the key phrase, and select the score for the key phrase as output.

The server hotword detection module 114 may receive the two scores from the language model 118 and the acoustic model 120. The server hotword detection module 114 may combine the two scores to determine an overall score for the audio signal. The server hotword detection module 114 may compare the overall score with the second threshold 116. When the overall score satisfies the second threshold 116, the server hotword detection module 114 determines that the audio signal likely encodes the key phrase. When the overall score does not satisfy the second threshold 116, the server hotword detection module 114 determines that the audio signal likely does not encode the key phrase.

In response to determining that the audio signal likely does not encode the key phrase, the speech recognition system 112 may send a message to the client device 102 indicating that the audio signal does not likely encode the key phrase. In some examples, the speech recognition system 112 might not send the client device 102 a message upon determining that the audio signal likely does not encode the key phrase.

When the server hotword detection module 114 determines that the audio signal likely encodes the key phrase, a tagged text generator 122 generates tagged text for the audio signal. The tagged text generator 122 may receive data from the language model 118, the acoustic model 120, or both, that indicates the n-grams encoded in the audio signal. For instance, the tagged text generator 122 may receive data from the acoustic model 120 that indicates scores for n-grams that are likely encoded in the audio signal, data representing the n-grams that are encoded in the audio signal, or other appropriate data.

The tagged text generator 122 uses the data from the language model 118, the acoustic model 120, or both, to generate tags for the n-grams encoded in the audio signal. For example, when the audio signal encodes "ok google play some music," the tagged text generator 122 may generate data representing the string "<hotword biasing> ok google </hotword biasing> play some music".

The speech recognition system 112 provides the tagged text for the audio signal to the client device 102 at time $T_D$. The client device 102 receives the tagged text and analyzes the tagged text to determine an action to perform. For instance, the client device 102 may use the tags included in the text to determine which portion of the text corresponds to the key phrase, e.g., the one or more first utterances, and which portion of the text corresponds to an action for the client device 102 to perform. For example, the client device 102 may determine, using the text "play some music," to launch a music player application and play music. The client device 102 may provide a user prompt requesting input of a music genre, a music station, an artist, or another type of music for playback using the music player application.

In some implementations, the client device 102 may be configured to detect any of multiple different key phrases encoded in an audio signal. For example, the client device 102 may receive input representing a user specified hotword, such as "hey indigo" or "hey gennie." The client device 102 may provide the speech recognition system 112 with data representing the user specified hotword. For instance, the client device 102 may send a text representation of the user specified hotword with the audio signal. In some examples, the client device 102 may provide the speech recognition system 112 with data for the user specified hotword that the speech recognition system 112 associates with an identifier for the client device 102, e.g., with a user account for the client device 102.

The client device 102 may have different key phrases for different physical geographic locations. For instance, the client device 102 may have a first key phrase for a user's home and a second, different key phrase for the user's office. The client device 102 may use one or more location devices 110 to determine a current physical geographic location for the client device 102 and select a corresponding key phrase. The client device 102 may send data to the speech recognition system 112 with the audio signal that identifies the key phrase based on the physical geographic location of the client device 102. The location devices 110 may include one or more of a global positioning system, a wireless device that detects a wireless signature, e.g., of a wireless hotspot or another device that broadcasts a signature, or a cellular antenna that detects information of cellular base stations.

In some examples, the client device 102 may send data to the speech recognition system 112 that indicates the physical geographic location of the client device 102. For instance, the client hotword detection module 106 may be configured for multiple, e.g., five, different key phrases each of which begin with the same n-gram prefix, e.g., "ok," and each of which is for use in a different physical geographic location. For example, the client device 102 may have a key phrase of "ok google" in a first location and "ok indigo" in a second location that is a different location from the first location. The client hotword detection module 106 may determine that an audio signal includes the n-gram prefix without determining which of the multiple different key phrases may be encoded in the audio signal. The client device 102, upon a determination by the client hotword detection module 106 that utterances in the audio signal satisfy the first threshold 108 of being a key phrase, may send the audio signal and location data for the client device 102 to the speech recognition system 112. The speech recognition system 112 receives the audio signal and the location data and uses the location data to determine a key phrase from the multiple different key phrases to use for analysis. The server hotword detection module 114 uses the determined key phrase to analyze the audio signal and determines whether the audio signal satisfies the second threshold 116 of being the determined key phrase.

In some implementations, the client device 102 is asleep, e.g., in a low power mode, when the client device 102 captures the audio signal, e.g., using the microphone 104. In the sleep mode, the client device 102 may not have full functionality. For instance, some features of the client device 102 may be disabled to reduce battery usage.

The client device 102 may begin to wake up upon determining that the first utterances satisfy the first threshold 108 of being a key phrase. For example, the client device 102 may enable one or more network connectivity devices, one or more of the location devices 110, or both, to allow the client device 102 to communicate with the speech recognition system 112.

When the client device 102 receives the tagged text data from the speech recognition system 112, the client device 102 exits the sleep mode. For instance, the client device 102 enables more functionality of the client device 102 to determine an action to perform using the tagged text, to perform an action determined using the tagged text, or both.

The speech recognition system 112 is an example of a system implemented as computer programs on one or more computers in one or more locations, in which the systems, components, and techniques described in this document are implemented. The client device 102 may include a personal computer, a mobile communication device, or another device that can send and receive data over a network 124. The network 124, such as a local area network (LAN), wide area network (WAN), the Internet, or a combination thereof, connects the client device 102, and the speech recognition system 112. The speech recognition system 112 may use a single server computer or multiple server computers operating in conjunction with one another, including, for example, a set of remote computers deployed as a cloud computing service.

Figure 2:
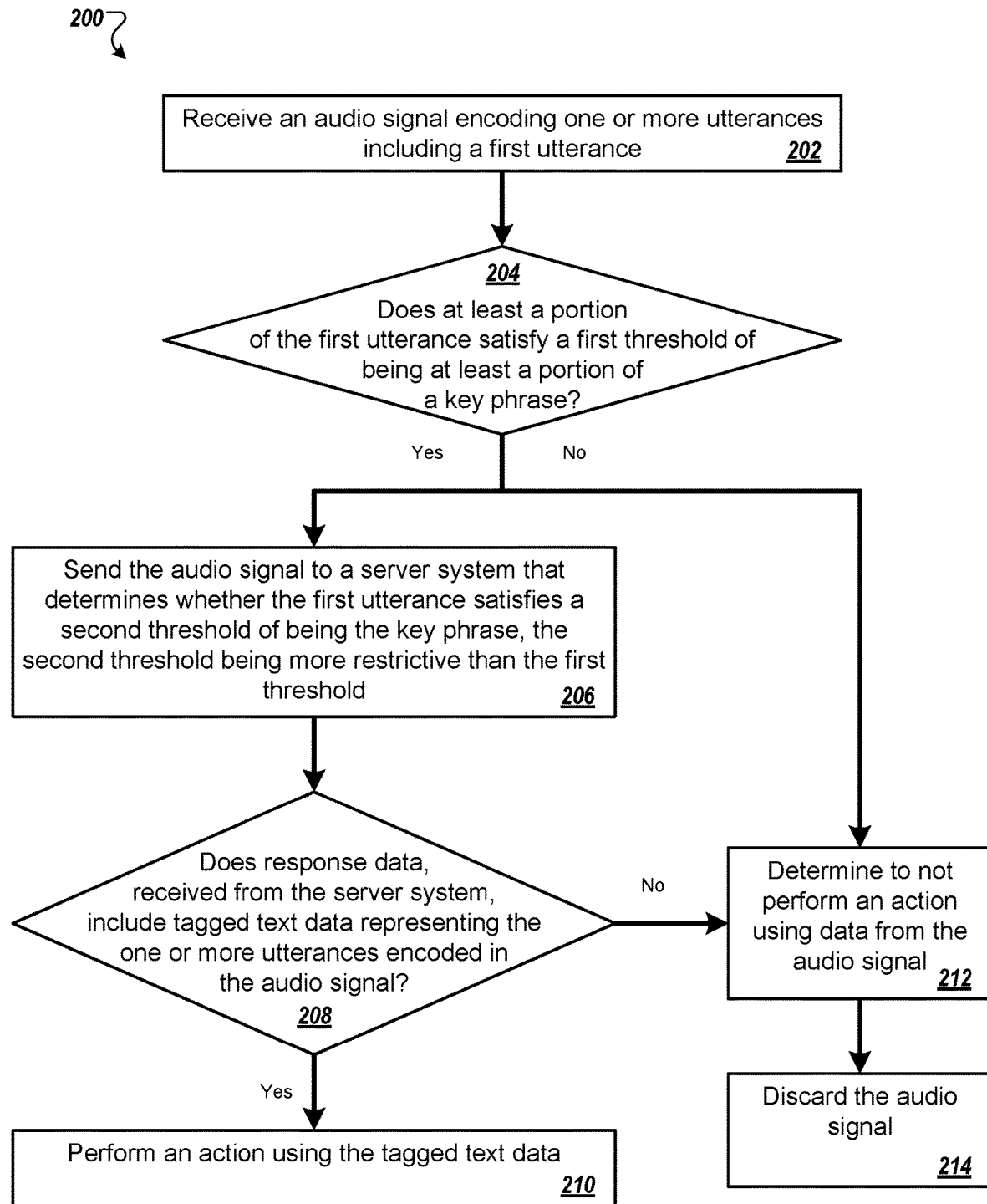
FIG. 2 is a flow diagram of a process for determining whether to perform an action.

FIG. 2 is a flow diagram of a process 200 for determining whether to perform an action. For example, the process 200 can be used by the client device 102 from the environment 100.

A client device receives an audio signal encoding one or more utterances including a first utterance (202). The client device may use any appropriate type of device to capture the audio signal. In some examples, the client device may receive the audio signal from another device, e.g., a smart watch.

The client device determines whether at least a portion of the first utterance satisfies a first threshold of being at least a portion of a key phrase (204). The client device may include data for one or more key phrases. The client device may determine whether at least the portion of the first utterance has at least a predetermined likelihood, defined by the first threshold, of being a portion of one of the key phrases. The portion of the first utterance may include one or more n-grams from the first utterance or another appropriate type of segment from the first utterance. In some examples, when the key phrase includes two or more words, the portion may include a single word from two or more first utterances. In some examples, the client device may determine whether multiple first utterances, e.g., one or more first utterances, satisfy the first threshold of being one of the key phrases.

In response to determining that at least a portion of the first utterance satisfies the first threshold of being at least a portion of a key phrase, the client device sends the audio signal to a server system that determines whether the first utterance satisfies a second threshold of being the key phrase (206). The second threshold is more restrictive than the first threshold. For instance, the client device may send the audio signal, or a portion of the audio signal, to the server, e.g., a speech recognition system, to cause the server to determine whether the first utterance satisfies the second threshold of being the key phrase. The server always analyzes all of the first utterances to determine whether the first utterances satisfy the second threshold of being the entire key phrase.

The client device determines whether response data, received from the server system, includes tagged text data representing the one or more utterances encoded in the audio signal (208). For example, the client device may receive the response data from the server in response to sending the audio signal to the server. The client device may analyze the response data to determine whether the response data includes tagged text data.

In response to determining that the response data includes tagged text data representing the one or more utterances encoded in the audio signal, the client device performs an action using the tagged text data (210). For instance, the client device uses the tags in the data to determine the action to perform. The tags may indicate which portion of the tagged data, and the respective portion of the audio signal, correspond to the first utterances for the key phrase. The tags may indicate which portion of the tagged data correspond to an action for the client device to perform, e.g., "play some music."

In response to determining that at least a portion of the first utterance does not satisfy the first threshold of being at least a portion of a key phrase or in response to determining that the response data does not include tagged text data, the client device determines to not perform an action using data from the audio signal (212). For instance, when none of the first utterance satisfies the first threshold of being the key phrase, the client device does not perform any action using the audio signal. In some examples, when the client device receives a message from the server that indicates that the audio signal did not encode the key phrase, e.g., the response data does not include tagged text data, the client device does not perform any action using the audio signal.

In response to determining that at least a portion of the first utterance does not satisfy the first threshold of being at least a portion of a key phrase or in response to determining that the response data does not include tagged text data, the client device discards the audio signal (214). For instance, when none of the first utterance satisfies the first threshold of being the key phrase, the client device may discard the audio signal. In some examples, when the client device receives a message from the server that indicates that the audio signal did not encode the key phrase, e.g., the response data does not include tagged text data, the client device may discard the audio signal. In some implementations, the client device may discard the audio signal after a predetermined period of time when one of these conditions occurs.

The order of steps in the process 200 described above is illustrative only, and determining whether to perform an action can be performed in different orders. For example, the client device may discard the audio signal and then not perform an action using data from the audio signal or may perform these two steps concurrently.

In some implementations, the process 200 can include additional steps, fewer steps, or some of the steps can be divided into multiple steps. For example, the client device may either discard the audio signal or not perform an action using data from the audio signal, instead of performing both steps.

Figure 3:
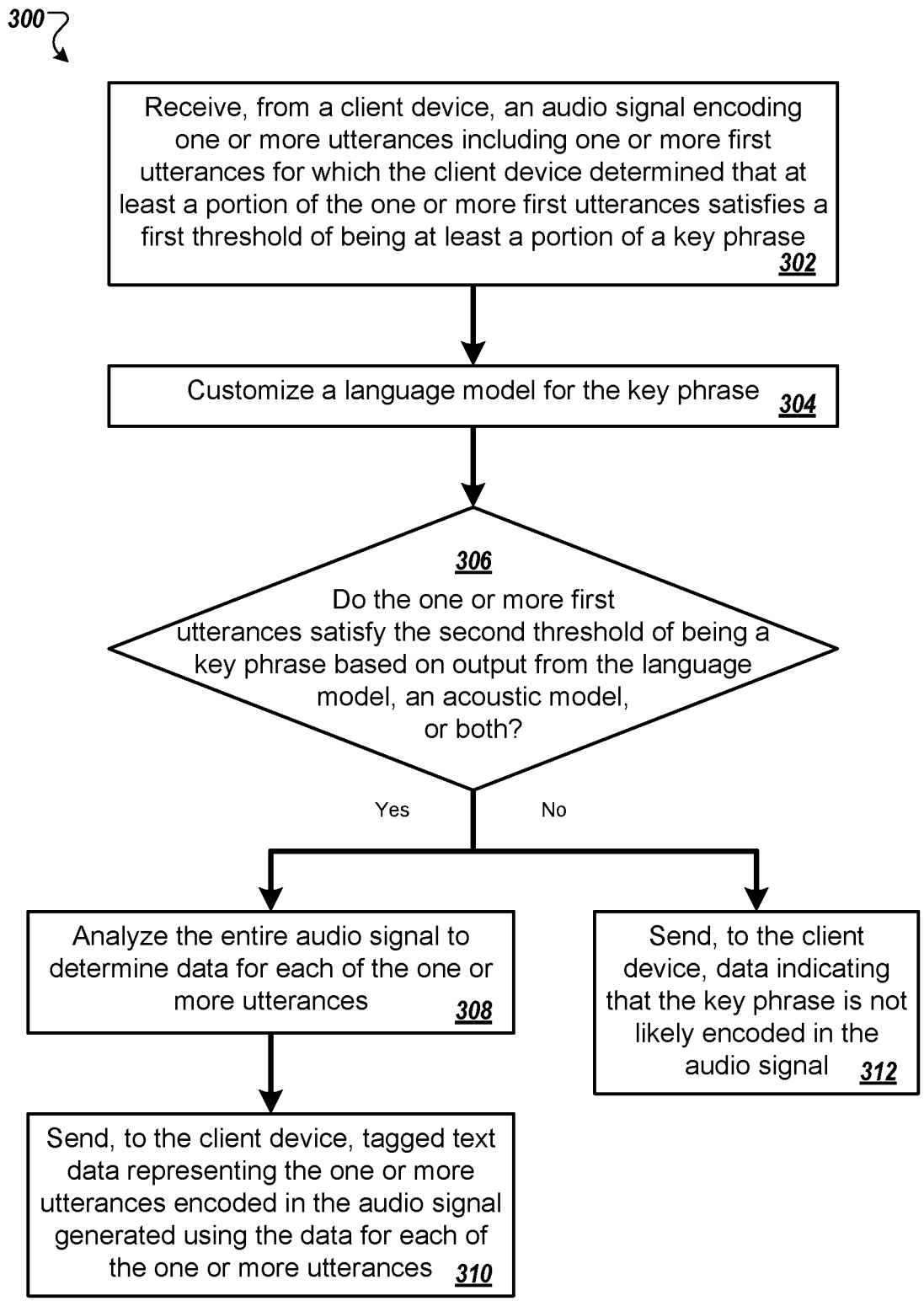
FIG. 3 is a flow diagram of a process for generating tagged text data for an audio signal.

FIG. 3 is a flow diagram of a process 300 for generating tagged text data for an audio signal. For example, the process 300 can be used by the speech recognition system 112 from the environment 100.

A speech recognition system receives, from a client device, an audio signal encoding one or more utterances including one or more first utterances for which the client device determined that at least a portion of the first utterance satisfies a first threshold of being at least a portion of a key phrase (302). The speech recognition system may receive the audio signal from the client device across a network. The client device may have sent the audio signal to the speech recognition system as part of a process that includes performing steps 202 through 206 described above with reference to FIG. 2.

The speech recognition system customizes a language model for the key phrase (304). For instance, the speech recognition system may increase a likelihood that the language model, which is not specific to any particular key phrase, will accurately identify an occurrence of the key phrase encoded in the audio signal. In some examples, the speech recognition system may adjust weights for the language model specific to the key phrase.

In some implementations, the speech recognition system may determine whether to use a default key phrase. For instance, the speech recognition system may determine whether a message received from the client device that includes the audio signal also includes data identifying a key phrase, e.g., text for the key phrase or an identifier that can be used to look up a key phrase in a database. The speech recognition system may determine to use a default key phrase when the message does not include data identifying a key phrase. For example, the speech recognition system may determine that the client device, or a corresponding user account, does not have a customized key phrase and to use a default key phrase.

The speech recognition system determines whether the one or more first utterances satisfy the second threshold of being a key phrase based on output from the language model, an acoustic model, or both (306). For instance, the speech recognition system provides the audio signal to the language model, the acoustic model, or both. The speech recognition system receives a score from the language model, the acoustic model, or both, that each indicate a likelihood that the one or more first utterances are the key phrase. The speech recognition system may combine the separate scores from the language model and the acoustic model to determine whether the combined score for the audio signal satisfies the second threshold of being the key phrase.

In response to determining that the first utterance satisfies the second threshold of being a key phrase based on output from the language model, the acoustic model, or both, the speech recognition system analyzes the entire audio signal to determine data for each of the one or more utterances (308). For example, an acoustic model generates output indicating a text string for the words likely encoded in the audio signal. A tagged text generator may apply tags to the text string that indicate one or more attributes of n-grams, e.g., words, included in the text sting. For instance, the tagged text generator may apply tags that identify a key phrase, an action word, e.g., "play," an application, e.g., music player, or a combination of two or more of these, to the text string.

The speech recognition system sends, to the client device, tagged text data representing the one or more utterances encoded in the audio signal generated using the data for each of the one or more utterances (310). The speech recognition system may send the tagged text data to the client device to cause the client device to perform an action using the tagged text data.

In response to determining that the first utterance does not satisfy the second threshold of being a key phrase based on output from the language model, the acoustic model, or both, the speech recognition system sends, to the client device, data indicating that the key phrase is not likely encoded in the audio signal (312). For instance, the speech recognition system may provide the client device with a message that indicates that the client device should not perform any action using data for the audio signal.

In some implementations, the process 300 can include additional steps, fewer steps, or some of the steps can be divided into multiple steps. For example, the speech recognition system might not customize the language model. In some examples, the speech recognition system may determine whether the first utterance satisfies the second threshold of being a key phrase using data or systems other than the language model, the acoustic model, or both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 4:
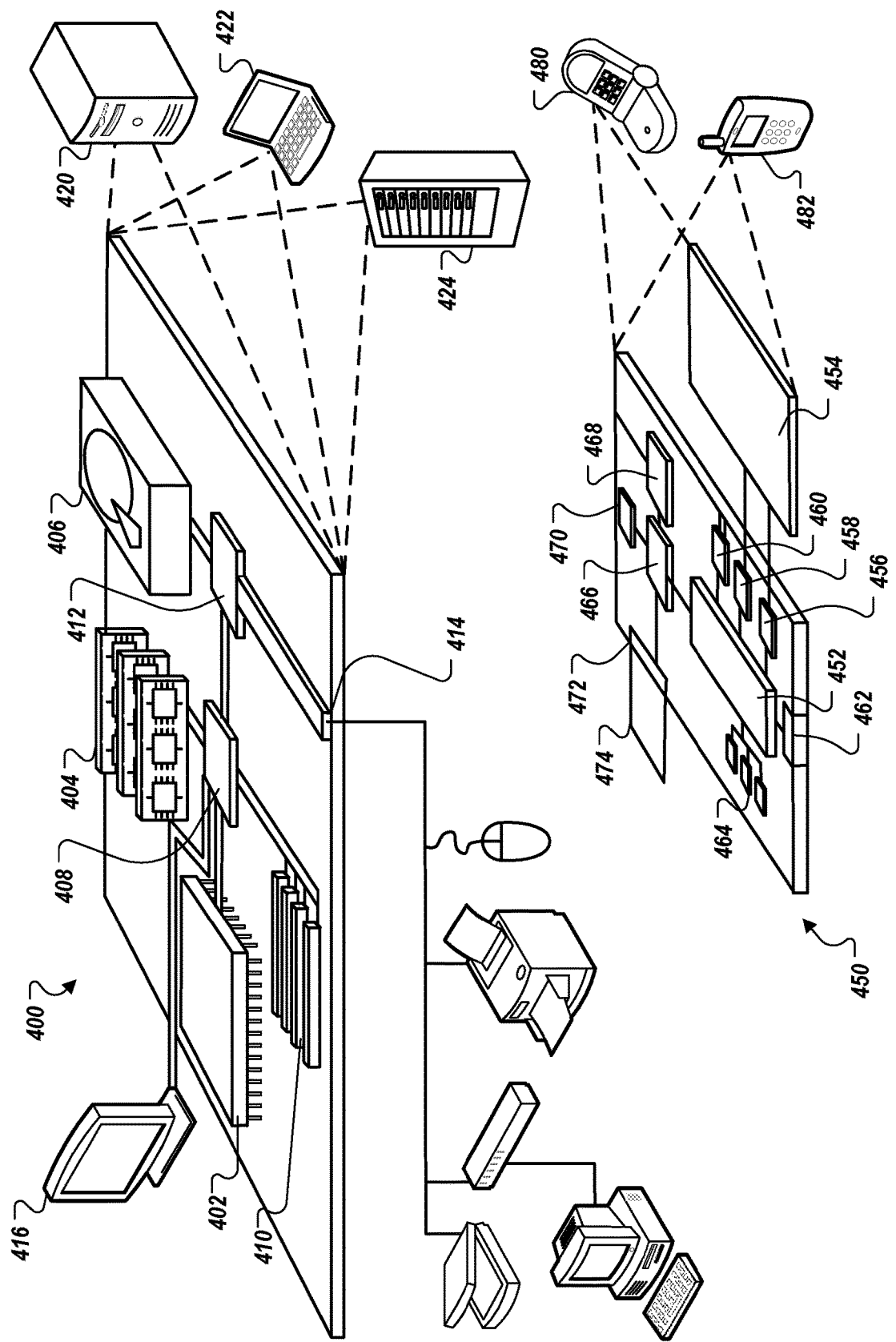
FIG. 4 is a block diagram of a computing system that can be used in connection with computer-implemented methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory. Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method, comprising:
   receiving, from a client device, an audio signal encoding one or more utterances for which the client device determined that at least a portion of the one or more utterances satisfies a first threshold of being at least a portion of a key phrase;
   determining whether the one or more utterances satisfy a second threshold of being at least a portion of the key phrase, a restrictive level of the second threshold being higher than a restrictive level of the first threshold; and
   sending, to the client device, data when it is determined that the one or more utterances satisfy the second threshold of being the key phrase.

2. The method of claim 1, wherein the determining includes:
   determining, using a language model, whether the one or more utterances satisfy the second threshold of being the key phrase.

3. The method of claim 2, further comprising:
   customizing the language model for the key phrase prior to the determining, using the language model, whether the one or more utterances satisfy the second threshold of being the key phrase.

4. The method of claim 3, further comprising:
   receiving text identifying the key phrase,
   wherein the customizing the language model for the key phrase includes customizing the language model for the key phrase using the text identifying the key phrase.

5. The method of claim 3, further comprising:
   receiving an identifier; and
   determining, using the identifier, key phrase data for the key phrase,
   wherein the customizing the language model for the key phrase includes customizing the language model for the key phrase using the key phrase data.

6. The method of claim 2, wherein the determining, using the language model, whether the one or more utterances satisfy the second threshold of being the key phrase includes:
   determining, using the language model and an acoustic model, whether the one or more utterances satisfy the second threshold of being the key phrase.

7. The method of claim 6, wherein the determining, using the language model and the acoustic model, whether the one or more utterances satisfy the second threshold of being the key phrase includes:
   providing data for the one or more utterances to the language model to cause the language model to generate a first output;
   providing data for the one or more utterances to the acoustic model to cause the acoustic model to generate a second output;
   combining the first output and the second output to generate a combined output; and
   determining, using the combined output, whether the one or more utterances satisfy the second threshold of being the key phrase.

8. The method of claim 2, further comprising:
   selecting the language model for a default key phrase.

9. The method of claim 8, further comprising:
   determining whether to use the default key phrase.

10. The method of claim 1, wherein the determining includes:
    determining, using an acoustic model, whether the one or more utterances satisfy the second threshold of being the key phrase.

11. A non-transitory computer storage medium storing instructions that, when executed by a computer, cause the computer to perform operations comprising:
    receiving, from a client device, an audio signal encoding one or more utterances for which the client device determined that at least a portion of the one or more utterances satisfies a first threshold of being at least a portion of a key phrase;
    determining whether the one or more utterances satisfy a second threshold of being at least a portion of the key phrase, a restrictive level of the second threshold being higher than a restrictive level of the first threshold; and
    sending, to the client device, data when it is determined that the one or more utterances satisfy the second threshold of being the key phrase.

12. The non-transitory computer storage medium of claim 11, wherein the determining includes:
    determining, using a language model, whether the one or more utterances satisfy the second threshold of being the key phrase.

13. The non-transitory computer storage medium of claim 12, further comprising:
    customizing the language model for the key phrase prior to the determining, using the language model, whether the one or more utterances satisfy the second threshold of being the key phrase.

14. The non-transitory computer storage medium of claim 13, further comprising:
    receiving text identifying the key phrase, wherein the customizing the language model for the key phrase includes customizing the language model for the key phrase using the text identifying the key phrase.

15. The non-transitory computer storage medium of claim 13, further comprising:
receiving an identifier; and
determining, using the identifier, key phrase data for the key phrase,
wherein the customizing the language model for the key phrase includes customizing the language model for the key phrase using the key phrase data.

16. The non-transitory computer storage medium of claim 12, wherein the determining, using the language model, whether the one or more utterances satisfy the second threshold of being the key phrase includes:
determining, using the language model and an acoustic model, whether the one or more utterances satisfy the second threshold of being the key phrase.

17. The non-transitory computer storage medium of claim 16, wherein the determining, using the language model and the acoustic model, whether the one or more utterances satisfy the second threshold of being the key phrase includes:
providing data for the one or more utterances to the language model to cause the language model to generate a first output;
providing data for the one or more utterances to the acoustic model to cause the acoustic model to generate a second output;
combining the first output and the second output to generate a combined output; and
determining, using the combined output, whether the one or more utterances satisfy the second threshold of being the key phrase.

18. The non-transitory computer storage medium of claim 12, further comprising:
selecting the language model for a default key phrase.

19. The non-transitory computer storage medium of claim 11, wherein the determining includes:
determining, using an acoustic model, whether the one or more utterances satisfy the second threshold of being the key phrase.

20. An apparatus, comprising:
processing circuitry configured to
receive, from a client device, an audio signal encoding one or more utterances for which the client device determined that at least a portion of the one or more utterances threshold of being at least a portion of a key phrase,
determine whether the one or more utterances satisfy a second threshold of being at least a portion of the key phrase, a restrictive level of the second threshold being higher than a restrictive level of the first threshold, and
send, to the client device, data when it is determined that the one or more utterances satisfy the second threshold of being the key phrase.

* * * * *